(12) United States Patent
Cook et al.

(10) Patent No.: US 6,481,319 B1
(45) Date of Patent: Nov. 19, 2002

(54) LATHE

(75) Inventors: Peter Henry Cook, Wivenhoe (GB); Ian Baulk, Littlehouse (GB)

(73) Assignee: 600 UK Limited, Leeds (GB)

( * ) Notice: Subject to any disclaimer, the term of this patent is extended or adjusted under 35 U.S.C. 154(b) by 0 days.

(21) Appl. No.: 09/806,392

(22) PCT Filed: May 30, 2000

(86) PCT No.: PCT/GB00/02060

§ 371 (c)(1), (2), (4) Date: Aug. 15, 2001

(87) PCT Pub. No.: WO01/10596

PCT Pub. Date: Feb. 15, 2001

(30) Foreign Application Priority Data

Aug. 9, 1999 (GB) .............................................. 9918623

(51) Int. Cl.⁷ .............................. B23B 3/00; B23B 5/00
(52) U.S. Cl. .............................. 82/117; 82/120; 82/149
(58) Field of Search ............................ 82/117, 120, 149

(56) References Cited

U.S. PATENT DOCUMENTS

| 3,586,395 A | * | 6/1971 | Weaver ........................ 384/39 |
| 4,738,170 A | * | 4/1988 | Isawa et al. .................... 29/40 |
| 5,052,089 A |  | 10/1991 | Gadaud et al. |
| 5,214,829 A |  | 6/1993 | Minagawa |

FOREIGN PATENT DOCUMENTS

| CZ | 190477 | 7/1937 |
| DE | 413796 | 9/1924 |
| FR | 680427 | 4/1930 |
| FR | 1238130 | 6/1960 |
| GB | 4593 | 11/1911 |

* cited by examiner

Primary Examiner—Jacob K. Ackun
(74) Attorney, Agent, or Firm—Workman, Nydegger & Seeley

(57) ABSTRACT

A lathe (10) has a lathe bed (11) on which is mounted a cutting station at which a cutting tool (13) can be mounted, a guide defining a guide path for guiding relative feeding movement between a workpiece holder (14) and the cutting tool (13), and drive means (15) for relatively moving the workpiece and the cutting tool (13) to engagement with each other. In order to provide a gap-swing facility, and avoid the present requirement in known lathes to provide a "removable gap-piece", the invention provides a guide in the form of three parallel guide elements, namely a main front guideway (17), a tailstock bed-way (18) and a rear ante-roll guide-way (19), which are spaced apart from each other and relative to the center line (16) of the workpiece holder (14). The three parallel guide elements (17, 18, 19) gap or cavity so that the required gap-swing facility is provided substantially without loss of guide-way support.

6 Claims, 1 Drawing Sheet

LATHE

BACKGROUND OF THE INVENTION

1. The Field of the Invention

This invention relates to a lathe having a lathe bed, a cutting station provided on the lathe bed and at which a cutting tool can be mounted, a guide mounted on the lathe bed and defining a guide path for guiding relative movement between a workpiece and the cutting tool, and drive means for relatively moving the workpiece and the cutting tool to engagement with each other.

2. The Relevant Technology

In known designs of lathe, it is usual to provide a so-called "removable gap-piece", and which (when removed) temporarily gives an increased "gap-swing" capacity for a short distance in front of the usual faceplate which holds the workpiece. However, with existing designs, the presumed requirement of lathe operators for a removable gap-piece facility presently imposes a number of technical drawbacks, which can include (a) loss of overall accuracy (b) reduction of rigidity and (c) undesirable wear characteristics of the lathe.

BRIEF SUMMARY OF THE INVENTION

The present invention therefore seeks, in one aspect, to provide an improved design of lathe which allows for elimination of a traditional removable gap piece, while at the same time seeking to provide improved overall accuracy in operation, rigidity and enhanced wear characteristics of the lathe.

According to one aspect of the invention there is provided a lathe having a lathe bed on which is mounted:

a) a cutting station at which a cutting tool can be mounted;
b) a guide defining a guide path for guiding relative feeding movement between a workpiece holder and the cutting tool; and
c) drive means for relatively moving the workpiece and the cutting tool to engagement with each other:
   in which the guide comprises three parallel guide elements which are spaced apart from each other and relative to the center line of the workpiece holder such that a permanent gap or cavity is defined in the lathe bed structure to provide a gap-swing facility and substantially without loss of guide-way support.

Preferably, the three parallel guide elements comprise a main front guideway, a tailstock bed-way, and a rear anti-roll guideway.

The drive means may take the form of a usual lead screw arrangement.

The cutting tool is preferably carried by a travelling assembly movable along the guide elements, and including two front carriages slidable along the main front guideway, and a further carriage unit slidable along the rear anti-roll guideway.

The preferred provision of a three-point linear guideway configuration (two carriages slidable along the front main guideway and one preferably less heavily pre-loaded carriage unit sliding on the rear anti-roll guideway) allows for some geometric misalignment, thus further improving overall slide-way accuracy.

The geometry of the arrangement of the guide elements, in relation to the center line of the workpiece holder (main spindle center line) is arranged, as indicated above, to provide a permanent cavity or gap in the lathe bed, and to allow for appropriate extra "gap-swing" which may be required, without the usual loss of slide-way support which naturally occurs when a traditional gap piece is removed in known designs of lathe provided with this facility.

Further advantages of the embodiment of the invention are that the loss of accuracy, often introduced by non-perfect refitting of a traditional gap piece (after removal for "swing-in gap work") is eliminated. In addition, the length limit imposed by a gap piece (to the desirably long and narrow) main guideway may also be eliminated, thus giving opportunity to increase this length and consequently provide improved slideway accuracy, rigidity and enhanced wear properties.

According to a further aspect of the invention there is provided a lathe having a lathe bed on which is mounted:

a) a cutting station at which a cutting tool can be mounted;
b) a guide defining a guide path for guiding feeding movement of the cutting tool relative to a workpiece holder; and
c) drive means for advancing the cutting tool into engagement with a workpiece when mounted on said holder;
   in which the lathe excludes provision of a removable gap piece, and in which said guide comprises three parallel guide elements which are spaced apart from each other and relative to the center line of the workpiece holder that a permanent gap or cavity is defined in the lathe bed to provide a gap-swing facility and substantially without loss of guide-way support for the movement of the cutting tool.

BRIEF DESCRIPTION OF THE DRAWINGS

A preferred embodiment of lathe according to the invention will now be described in detail, by way of example only, with reference to the accompanying drawings, in which.

DETAILED DESCRIPTION OF THE PREFERRED EMBODIMENTS

Figure 1:
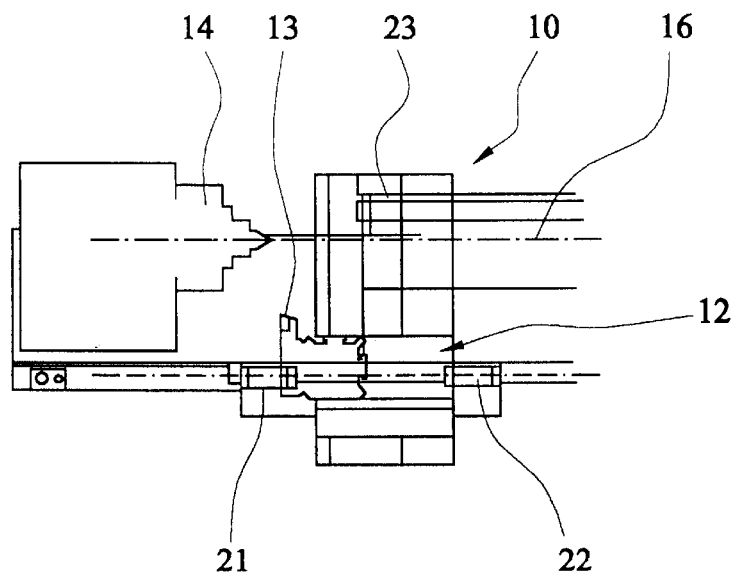
FIG. 1 is a plan view of part of the lathe according to the invention.
Figures 2, 3:
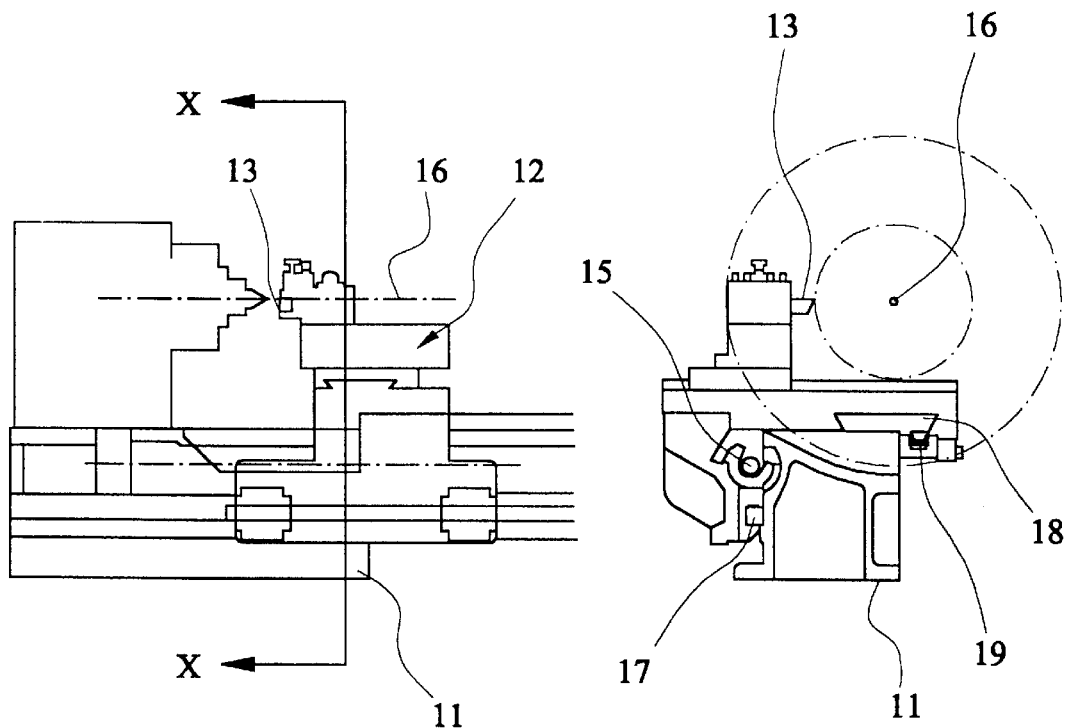
FIG. 2 is a front view of the part of the lathe shown in FIG. 1.
FIG. 3 is an end view and taken on sectional line X—X in FIG. 2.

Referring now to the drawing, there is shown a preferred embodiment of lathe according to the invention, and which eliminates provision of traditional removable "gap-piece". A gap-piece is traditionally provided in existing designs of lathe, in order to provide, temporarily, an increased gap-swing capacity for a short distance in front of the usual face plate holding a workpiece, whilst the gap piece is removed.

The lathe according to the invention excludes requirements for provision of a removable gap piece, while still providing a gap swing facility, and while at the same time also giving improved and increased overall accuracy, rigidity and wear characteristics to the lathe according to the invention.

The lathe is designated generally by reference 10, and includes a lathe bed structure 11 on which is mounted a travelling cutting station assembly 12 which carries cutting tool 13. The bed 11 also mounts a guide which defines a guide path for guiding relative feeding movement between a workpiece (not shown) carried by workpiece holder 14 and the cutting tool 13. There is also provided drive means for relatively moving the workpiece and the cutting tool to engagement with each other, and which takes the form of a lead screw arrangement 15.

The travelling cutting station assembly 12 is slidable along three parallel guide elements, which constitute the tool guide, and which are spaced apart from each other, and also relative to the center line 16 of the workpiece holder 14, which comprises usual main spindle center line.

The three parallel guide elements which make up the tool guide comprise a main front guideway 17, a tailstock bed-way 18 and a rear anti-roll guideway 19.

By virtue of the geometry of the arrangement of the three parallel guide elements, both in relation to each other, and also relative to the center line 16 of the workpiece holder, a permanent gap or cavity can be defined in the lathe bed structure 11 to provide a guide-swing facility, and substantially without loss of slideway (guide way) support.

The cutting tool 13 is carried by travelling assembly 12 which is slidable along the guide elements, and comprises two front carriages 21 and 22 which are slidable along the main front guideway 17, which is a long narrow front guideway.

The travelling assembly 12 also includes a less heavily pre-loaded carriage unit 23 which is slidable along the rear anti-roll guideway 19.

Therefore, in the embodiment of lathe 10 according to the invention, a gap swing facility is provided, despite the absence of the traditional arrangement of removable gap piece. This is achieved substantially without loss of slideway support, which normally occurs when a traditional removable gap piece feature is provided, and upon removal.

Furthermore, the embodiment of the invention can avoid the loss of accuracy, which is often introduced by non-perfect refitting of a traditional gap piece, after removal for "swing-in gap work". In addition, the length limit imposed by a traditional removable gap piece (to the desirably long and narrow) main guideway is also eliminated, thus giving opportunity to increase this length and consequently provide improved slideway accuracy, rigidity and enhanced wear resistant properties.

The three point linear guideway configuration (the carriages 21 and 22 on the front main guide way 17 and the preferably less heavily pre-loaded carriage unit 23 sliding on the rear anti-roll guideway 19) allows for some geometric mis-alignment, thus further improving overall slideway accuracy. Furthermore, the low position of the main guide way 17 relative to the spindle center line 16, together with the positioning of the lead screw 15 (near the main guideway 17, but between the main guideway 17 and rear guideway 19) causes major cutting forces to be absorbed directly into the main guideway 17, thus promoting maximum load capacity and further enhancing long term accuracy, rigidity and wear resistant characteristics.

What is claimed is:

1. A lathe comprising a lathe bed on which is mounted:

a cutting tool;

a workpiece holder adapted to hold a workpiece;

a guide defining a guide path for guiding relative feeding movement between the workpiece holder and the cutting tool, the guide comprising a front guide-way, a tailstock bed-way, and a rear guide-way which extend parallel to each other; and drive means for relatively moving the workpiece holder and the cutting tool so that the cutting tool can engage the workpiece when mounted on the workpiece holder, the front guide-way extending lengthwise of the lathe bed towards the workpiece holder and beyond the ends of the tailstock bedway and the rear guide-way so as to define a permanent gap or cavity in the lathe bed and thereby provide a gap swing facility without requirement for a removable gap piece and substantially without loss of guide-way support.

2. A lathe according to claim 1, in which the cutting tool is carried by a traveling assembly which is movable along the guide, the traveling assembly including a first carriage and a second carriage which are slidable along the front guide-way, and a further carriage which is slidable along the rear guide-way.

3. A lathe according to claim 2, in which the first carriage is selectively movable on the front guide-way to a position substantially below the workpiece holder.

4. A lathe according to claim 2, in which the drive means comprises a lead screw arrangement which is operative to move the traveling assembly towards the workpiece holder.

5. A lathe according to claim 4, in which the front guide-way is located a sufficient distance below a center line of the workpiece holder, and the lead screw arrangement is arranged near to the front guide-way and between the front guide-way and the rear guide-way so as to provide a lathe guide geometry which causes the major cutting forces to be absorbed directly into the front guide-way.

6. A lathe according to claim 1, in which the rear guide-way is an anti-roll guide-way.

\* \* \* \* \*

UNITED STATES PATENT AND TRADEMARK OFFICE
CERTIFICATE OF CORRECTION

PATENT NO.     : 6,481,319 B1
DATED          : November 19, 2002
INVENTOR(S)    : Peter Henry Cook and Ian Baulk It is certified that error appears in the above-identified patent and that said Letters Patent is hereby corrected as shown below:

<u>Title page,</u>
Item [56], FOREIGN PATENT DOCUMENTS, change "CZ" to -- CH --.
Item [57], ABSTRACT,
Line 12, before "guide-way (19)" change "ante-roll" to -- anti-roll --.

Signed and Sealed this

Third Day of June, 2003

JAMES E. ROGAN
*Director of the United States Patent and Trademark Office*